(12) United States Patent
Srinivasachar et al.

(10) Patent No.: US 8,277,542 B2
(45) Date of Patent: Oct. 2, 2012

(54) METHOD FOR CAPTURING MERCURY FROM FLUE GAS

(76) Inventors: Srivats Srinivasachar, Sturbridge, MA (US); Steven A. Benson, Grand Forks, ND (US)

( * ) Notice: Subject to any disclaimer, the term of this patent is extended or adjusted under 35 U.S.C. 154(b) by 430 days.

(21) Appl. No.: 12/507,168

(22) Filed: Jul. 22, 2009

(65) Prior Publication Data

US 2010/0018395 A1    Jan. 28, 2010

Related U.S. Application Data

(60) Provisional application No. 61/083,095, filed on Jul. 23, 2008.

(51) Int. Cl.
*B01D 53/02* (2006.01)

(52) U.S. Cl. ............................................ 95/107; 95/134

(58) Field of Classification Search .................... 95/107, 95/134; 110/203, 345; 423/210
See application file for complete search history.

(56) References Cited

U.S. PATENT DOCUMENTS

| | | | | |
|---|---|---|---|---|
| 4,889,698 A | * | 12/1989 | Moller et al. | 423/210 |
| 5,002,741 A | * | 3/1991 | Hooper | 423/239.1 |
| 5,897,688 A | * | 4/1999 | Voogt et al. | 95/133 |
| 5,964,921 A | * | 10/1999 | Uitvlugt | 95/13 |
| 6,375,909 B1 | * | 4/2002 | Dangtran et al. | 423/235 |
| 6,451,094 B1 | * | 9/2002 | Chang et al. | 95/901 |
| 6,558,454 B1 | | 5/2003 | Chang et al. | |
| 6,848,374 B2 | | 2/2005 | Srinivasachar et al. | |
| 6,953,494 B2 | | 10/2005 | Nelson, Jr. | |
| 6,974,564 B2 | | 12/2005 | Biermann et al. | |
| 7,780,765 B2 | * | 8/2010 | Srinivasachar et al. | 95/134 |
| 2003/0103882 A1 | * | 6/2003 | Biermann et al. | 423/210 |
| 2003/0206843 A1 | * | 11/2003 | Nelson, Jr. | 423/210 |
| 2004/0003716 A1 | * | 1/2004 | Nelson, Jr. | 95/134 |
| 2005/0039598 A1 | | 2/2005 | Srinivasachar et al. | |
| 2008/0060519 A1 | * | 3/2008 | Maly et al. | 95/107 |
| 2009/0056538 A1 | | 3/2009 | Srinivasachar et al. | |
| 2011/0250111 A1 | * | 10/2011 | Pollack et al. | 423/210 |

OTHER PUBLICATIONS

Ho, T.C., et al "Characteristics of Mercury Desorption at Elevated 1999 Temperatures," vol. 18 Waste Management, pp. 445-452.
http://www.netl.doe.gov/publications/proceedings/06/mercury/presentations/Holmes_presentation_121106.pdf, 2006.
http://www.netl.doe.gov/publications/proceedings/06/mercury/presentations/Kang_presentation_121106.pdf, 2006. http://www.netl.doe.gov/publications/proceedings/07/mercury/presentations/Dillon_Pres%20.pdf, 2007.
http://www.netl.doe.gov/publications/proceedings/07/mercury/presentations/Kang_Pres%20.pdf, 2007.
http://www.netl.doe.gov/publications/proceedings/07/mercury/summaries/Landreth_summary.pdf, 2007.

* cited by examiner

*Primary Examiner* — Duane Smith
*Assistant Examiner* — Christopher P Jones
(74) *Attorney, Agent, or Firm* — Brian M. Dingman; Mirick, O'Connell, DeMallie & Lougee

(57) ABSTRACT

The present invention relates to use of carbon-based sorbents such as activated carbon for controlling vapor phase mercury emissions in coal-fired power plant flue gases or waste incineration flue gases. The invention features new methods that improve the performance of carbonaceous sorbents for mercury control compared to the previous methods. One method consists of injecting the sorbent (consisting of at least some carbonaceous material) into the flue gas where the flue gas temperature is at a value above about 1100° F. and below about 2000° F. The invention also consists of injecting the sorbent within or upstream of an economizer section in a coal-fired power boiler. Injecting the sorbent at the locations indicated above, rather than further downstream, provides increased residence time for contact between the flue gas and the sorbent resulting in increased mercury capture, improved sorbent utilization, and improved fly ash properties.

24 Claims, 5 Drawing Sheets

METHOD FOR CAPTURING MERCURY FROM FLUE GAS

CROSS REFERENCE TO RELATED APPLICATION

This application claims priority of Provisional Patent Application Ser. No. 61/083,095, filed on Jul. 23, 2008, the entire disclosure of which is incorporated herein by reference.

FIELD OF THE INVENTION

The present invention relates to the removal of mercury from the flue gases generated during the combustion of fossil fuels such as coal, or the combustion of solid wastes.

BACKGROUND OF THE INVENTION

Carbon-based sorbents such as activated carbon are currently used for controlling vapor phase mercury emissions in coal-fired power plant flue gases or waste incineration flue gases. In a typical coal-fired power plant, the configuration consists of a boiler, where water is evaporated to steam, followed by a steam super-heater section, a steam re-heater section, an economizer section (where the boiler feed-water is pre-heated), and finally an air heater, where the combustion air is pre-heated (FIG. 1). The combustion flue gas is cooled as it passes through each of these sections, transferring its heat to the water/steam stream on the other side of the heat exchangers. In a typical application, carbon sorbents are injected in the flue gas duct upstream of a particulate removal device such as a fabric filter or an electrostatic precipitator (e.g., the particulate collection device in FIG. 1), usually downstream of the air pre-heater and before the particulate removal device. The activated carbon used for such injection is manufactured off-site from carbonaceous materials like coal or coconut shells.

When powdered activated carbon was used in various applications with differing flue gas compositions, it was discovered that the efficiency of mercury capture varied significantly. For example, in the case when a low-halogen containing coal is combusted, the flue gases generated therein have a low concentration of halogen species such as HCl. In such cases, plain activated carbon performed poorly, i.e. the amount of material required to achieve desired capture efficiency was higher than when higher levels of halogen species were present in the flue gas. Methods to overcome this problem include adding a halogen component to the activated carbon sorbent prior to injection in the flue gas (see, e.g., U.S. Pat. No. 6,953,494). A method to add the halogen component as a separate stream from the activated carbon has also been used to address this issue The literature shows data on the improved performance of halogen-treated carbon for low-halogen content flue gas applications versus a plain activated carbon (see, e.g., U.S. Pat. No. 6,953,494).

Another problem with currently disclosed and used mercury control sorbents is their inability to perform with high efficiency in high concentration sulfur-containing flue gas. Kang et al. disclose results from using halogen-treated activated carbons for mercury control in relatively high sulfur concentration flue gases and discovered that a significantly higher quantity (almost 5 to 10 times) of activated carbon is required for achieving larger eduction in mercury emissions compared to cases where the flue gases had low concentration of sulfur species such as sulfur dioxide and sulfur trioxide. The coal sulfur concentration was 2.5 percent in the high sulfur case compared to about 0.4 percent sulfur in the coal in the low sulfur case.

These data show that not only does a lack of halogen components in the flue gas, but also the presence of sulfur species in the flue gas, adversely affect the performance of activated carbon in removing mercury species from the flue gas.

In another application, sulfur trioxide is injected into the flue gas upstream of a electrostatic precipitator (ESP) to improve and thereby achieve acceptable particulate capture performance. The injected sulfur trioxide (an ESP conditioning agent) adsorbs on the fly ash particles, lowering the resistivity of the collected dust in the precipitator to within an ideal range of values, thereby improving overall precipitator performance. However, Dillon et al. showed that $SO_3$ conditioning impairs mercury capture. For example, with no $SO_3$ injection and an activated carbon (brominated) injection rate of 4 lbs of carbon per million actual cubic feet of flue gas (MMacf), 75-90 percent mercury reduction was obtained. At the same sorbent injection rate, and with 5.4 ppm of $SO_3$ in the flue gas for improved ESP performance, only 35-50% mercury reduction was obtained. In this case, the sorbent was injected around 300-350.degree. F., downstream of the air pre-heater and upstream of the ESP. When the sorbents were injected upstream of the air pre-heater, at around 650-750.degree. F., at an injection rate of 5 pounds of sorbent per million cubic feet of flue gas, an 85 percent reduction in mercury concentration was achieved compared to about 60 percent reduction when the same quantity of sorbent was injected downstream the air pre-heater.

These data show that there is some benefit for mercury capture by injecting the sorbents upstream of the air pre-heater in a coal-fired boiler, as opposed to downstream of the air heater.

Srinivasachar and Kang (US Patent Application No. 20050039598 and US Patent Application No. 20090056538) describe a method for removing mercury from the products of fuel conversion comprising: disposing carbonaceous sorbent into contact with the products of fuel conversion at a contact location having a temperature between 400.degree. F. and 1100.degree. F., whereupon the carbonaceous sorbent adsorbs mercury; and removing the carbonaceous sorbent having mercury adsorbed thereon. They also describe injecting the sorbent upstream of the air heater. See, also, Kang et al. 2007

Another application where mercury capture is difficult and requires large quantities of sorbent material to achieve high capture efficiencies is for coal-fired boilers equipped with a hot-side electrostatic precipitator. In this application, the coal-fired boiler configuration consists of an evaporator section, followed by a steam super-heater and re-heater section and an economizer section. The flue gases leaving the economizer are then directed to a hot-side electrostatic precipitator to remove the particulates before sending the "clean" flue gas to an air pre-heater, where heat is transferred from the hot flue gas to the combustion air, which is then routed to the boiler. In this configuration, sorbent, such as activated carbon or halogenated activated carbon, is injected upstream of the hot-side ESP at around 500 to 700.degree. F. Because of the short residence time for contact between the sorbent and the flue gases in such a configuration, mercury capture performance is poor. For example, with the injection of brominated activated carbon at 5 pounds per million actual cubic feet of flue gas, only 60 to 70% mercury removal was achieved in flue gas generated from a Powder River Basin coal (sub-bituminous, low sulfur).

There is a need for improved mercury control performance in hot-side ESP applications.

Yet another problem with using activated carbon sorbents for mercury control is that when the spent carbon is mixed with the ash in the particulate collection device, it renders the ash unusable for some end-applications such as concrete. This is because when fly ash is used in concrete manufacturing, if it has certain components that adsorb the hydrophobic air entraining agents that are used in concrete manufacturing, then it is rejected for such end use. Activated carbon because of its surface area and its propensity to adsorb the air entraining agents is deleterious. A foaming index test is used to evaluate the suitability of the ash for use in concrete: if the foaming index is below a critical value, then the ash is suitable for use in concrete.

Kang et al. (2007) provide data for the impact of activated carbon injection upstream of an air heater at around 800.degree. F. where the foam index value of the resulting ash increased from about 150 with no sorbent injection to around 500 with the injection of approximately 0.8 pounds of sorbent per million actual cubic feet of flue gas (density calculated at 300.degree. F.). This sorbent injection rate was required to achieve 90 percent mercury removal. The acceptable foam index value was around 250 for commercial fly ash sales, and so the injected sorbent proved to be deleterious for subsequent use of the ash for concrete applications. Note that foam index values indicated above were provided in units unique to their measurement technique and were to be considered only on a relative basis.

There is a need for methods to mitigate the deleterious effects of activated carbon-based sorbents on ash, when the ash is used in end applications such as concrete.

Biermann et al. (U.S. Pat. No. 6,974,564) disclose a clay and limestone byproduct from the papermaking industry as an adsorbent for mercury, which is injected into the high temperature region flue gas (around 2000.degree. F.). The injection rates for 95 percent capture are in the range of 20 lb/MWh a factor of 20 larger than typical activated carbon injection and 0.8-3.2 lb/MWh, for 75 percent reduction, a factor of 4 larger typical carbon injection rates. The high injection rates are likely to be expensive and also may affect the performance of the power plant components by depositing and fouling their surfaces. Also the injection of large quantities of material may adversely affect the performance of particulate collection devices and may result in increased particulate emissions.

Chang et al. (U.S. Pat. No. 6,558,454) describe a process for removing vapor phase contaminants from a gas stream that includes the step of adding a "raw carbonaceous starting material" into a gas stream having an "activation temperature" sufficient to convert the raw carbonaceous starting material into an "activated material" in-situ. The "raw carbonaceous starting material" can be either a solid-phase, liquid phase or vapor-phase material. The "activated material" then adsorbs the vapor phase contaminants (e.g. mercury), and the "activated material" containing the vapor phase contaminants is removed from the gas stream using a particulate collection device. The process further claims an injecting step, where said injecting step includes the step of injecting said "raw carbonaceous starting material" into said gas stream wherein said activation temperature of said gas stream is between about 100.degree. C. and about 1400.degree. C. In addition, the gas stream residence time, which is the amount of time the "raw carbonaceous starting material is present in the gas stream" into which it is injected before conversion to an "activated material" was indicated to be about 0.1 to 30 seconds.

The process above is not very effective as it uses a raw carbonaceous material as the material for injection. Therefore, the produced sorbent within the flue gas is not optimum, as it does not have a high activity and a high surface area.

Chang et al. identify the process of producing "activated carbon", the preferred sorbent for sorption of trace contaminants such as mercury from fluid streams, as normally being carried out in large rotary kilns with treatment time of several hours. An object of their invention was to provide a method to generate an alternative "activated material" separate from "activated carbon" which was indicated to be expensive. While Chang et al. used a gas stream for contacting the raw carbonaceous material with temperatures in the range of 100 to 1400.degree. C. for the purposes of activation, they did not anticipate the beneficial effects of injecting an engineered material such as activated carbon at high temperatures and did not identify a preferred temperature range for the purposes of removing the vapor phase contaminant such as mercury using activated carbon.

Per the embodiments of Chang et al. (U.S. Pat. No. 6,558,454) described in FIGS. 4 and 5 of the patent, (Column 7; lines 20 to 30), the raw carbonaceous material is injected via an injector into the boiler and at a high temperature to activate the raw material, but the "activated material," that is activated externally to the boiler in these embodiments, is injected into the "exhaust stream from the boiler," likely at much lower temperatures around 300.degree. F. and not within the boiler.

For the above reasons, Chang et al. does not provide an optimum temperature range for contacting activated carbon with gas streams containing contaminants such as mercury to maximize mercury capture by the activated carbon.

Powdered activated carbon (PAC) can be injected into the flue gas in a coal-fired power plant at several locations. One such location is the region upstream of the air heater at temperatures between 500 and 800.degree. F. PAC is typically injected with air as the carrying medium and through lances that penetrate completely into the flue gas duct to ensure good distribution of the PAC with the flue gas.

During the process of injection at high temperature locations, the carbon particles are subjected to high temperatures as well as high oxygen concentrations within the injection lances. Consequently, the carbon particles can start oxidizing and burning within the injection lances, deteriorating the sorbent and potentially even destroying them, as well as potentially causing other operational problems such as local deposition, plugging and over-heating. This is one additional challenge of using activated carbon sorbent for mercury control while injecting the sorbent at high temperatures.

SUMMARY OF THE INVENTION

A method of the present invention consists of injecting the sorbent (consisting of at least some carbonaceous material) into the flue gas where the flue gas temperature is at a value above about 1100° F. and below about 2000° F. Injecting the sorbent at the locations corresponding to this temperature range, rather than further downstream at a cooler temperature, provides increased residence time for contact between the flue gas and the sorbent resulting in increased mercury capture and improved sorbent utilization. This invention overcomes limitations of the aforementioned methods including the ability to remove mercury from flue gases with a high efficiency in:

Low-halogen species concentration environments, which are created when combusting low-halogen containing fuels (less than 100 ppm by weight of fuel) such as Powder River Basin sub-bituminous and North Dakota lignite coals in the US;

High sulfur species environments, which are created when combusting high sulfur coals;

High sulfur trioxide environments, which are created when $SO_3$ is injected for flue gas conditioning for improving ESP performance with high resistivity fly ash;

A hot-side electrostatic precipitator, where the contact time between sorbent and flue gas is low and collection temperature of the particulate is high (about 500 to 800° F.) compared to a cold-side precipitator; and The use of ash collected with carbonaceous sorbent in concrete applications.

Srinivasachar et al. (US Patent Application 2009/0056538) describe a method for removing mercury from flue gases generated by the combustion of coal comprising (i) storing a starter batch of activated carbon in an agglomerated state; (ii) deagglomerating the starter batch in a separation device to create a contact batch of activated carbon; (iii) transporting the contact batch to a contact location; (iv) injecting the contact batch into contact with the flue gas at a contact location having a temperature between 400° F. and 1100° F., whereupon the activated carbon of the contact batch adsorbs mercury from the flue gas; and (v) removing the activated carbon having mercury adsorbed thereon from the flue gas.

Srinivasachar et al. (US Patent Application 2009/0056538) identify the most preferred temperature range for carbon injection to be between around 550 and 750° F. (paragraph 82), and identify the optimum injection location of the carbonaceous sorbent into the flue gas between the economizer and the air heater in the convective back-pass section of the boiler. Above this temperature range, fine activated carbon particles are expected to quickly combust in the hot flue gas.

In the current invention, the optimum injection temperature is identified to be around 1300° F., with the temperature range preferably between 1100 and 2000° F. The optimum flue gas temperature for injection would be within a temperature range of the superheater/reheater or economizer, i.e. between the entrance to the superheater/re-heater section and exit of the economizer section in a typical coal-fired boiler. Good results are achieved at this temperature range despite the suggestion in the prior art that PAC would not survive under these conditions.

While not bound by theory, it is known that the adsorption of gas phase mercury species on activated carbon would occur at lower temperatures and desorption would occur at higher temperatures. Furthermore, the desorption of halogenated mercury species occurs at higher temperatures than elemental mercury. See Ho, T. C., Yang, P., Kuo, T. H. and Hopper, J. R. Characteristics of Mercury Desorption at Elevated Temperatures, Volume 18 (1998) Waste Management, pp. 445-452.

It is hypothesized that the first step in the sorption of gas phase mercury is the conversion of elemental mercury to oxidized/halogenated mercury species. This step is kinetically limited and is more effective at higher temperatures. In the flue gas path once the activated carbon sorbent is injected into the flue gas at a location such as in the superheater/reheater section or economizer section, some of the sorbent particles would be deposited on boiler heat transfer surfaces that are significantly lower temperature than the flue gas. The lower temperature should help the PAC to survive in the high-temperature flue gas stream. Also, the lower temperature allows the particles to act as sites for adsorption and capture of the halogenated mercury species. Once the halogenated mercury species is adsorbed it would be require a much higher temperature to desorb than elemental mercury. Thus the adsorbed halogenated mercury species would be retained by the activated carbon sorbent particles.

In one example of the present invention, carbonaceous materials that have a relatively high surface area are used. The surface area for the materials to be used in this example of the invention is greater than about 250 $m^2$ per gram, preferably more than 400 $m^2$ per gram, and most preferably greater than 500 $m^2$ per gram. Such carbonaceous materials include activated carbon, particularly powdered activated carbon or activated carbon impregnated with additives such as halogen compounds and/or such activated carbons combined with alkaline materials including calcium compounds such as lime and calcium hydroxide, magnesium compounds such as magnesium oxide and magnesium hydroxide, sodium compounds such as sodium carbonate, sodium bicarbonate and trona.

The invention dramatically improves performance of carbonaceous sorbents for mercury control compared to the previous methods.

One example of the present invention consists of injecting the sorbent (consisting of at least some carbonaceous material) into the flue gas where the flue gas temperature is at a value above about 1100° F. and below about 2000° F. More preferably the injection location is such the material is injected into the flue gas, where the flue gas temperature is most preferably above 1300° F., but below about 2000° F.

An example of the present invention also consists of injecting the sorbent within or upstream of an economizer section in a coal-fired power boiler. Typical flue gas temperatures at the inlet of an economizer vary between 800 and 1200° F. and the water temperatures in the water-side of the heat exchanger (the economizer) range from 300 to 700° F. The presence of such relatively cold surfaces in the economizer section through which the sorbent passes and potentially deposits on enables mercury capture to occur in this region even though the bulk flue gas temperatures in this location is much too high for mercury capture by the sorbent.

Depending on the design of the coal-fired boiler, sorbent injection is also advantageously achieved by injecting the sorbent upstream of the economizer such as in the convective re-heater or super-heater sections.

Injecting the sorbent at the locations indicated above, rather than further downstream, provides both increased residence time for contact between the flue gas and the sorbent and higher temperatures for conversion of elemental mercury in flue gas to oxidized mercury species, a prerequisite for mercury capture, ultimately resulting in increased mercury capture and improved sorbent utilization.

Another aspect of the invention is a method of injection of the sorbent (consisting of at least some carbonaceous material) into the flue gas. In practical applications, the duct carrying the flue gas is relatively large (for example, 15'×40' cross-section for a 300 $MW_e$ boiler) and the sorbent has to be distributed throughout the duct cross-section to ensure good contact with the flue gas and to be provided the opportunity to capture mercury in the flue gas. Good sorbent distribution is typically achieved by placing several lances with multiple openings for sorbent discharge, which exposes the lances to surrounding hot flue gas. At the temperatures proposed herein, if under normal conditions the sorbent is injected through lances placed in the flue gas duct and the carrying medium for the sorbent is air, the sorbent can start burning, deteriorating the sorbent and causing other operational problems such as injector plugging. To avoid this problem, the mode of injection of the sorbent herein can be changed from standard methods by using an inert or non-reactive gas as the transport medium for the sorbent. Examples of preferred transport gas include steam, nitrogen, argon, or combusted flue gases with little or no residual oxygen. The transport gas is made up predominantly of components that do not react with the sorbent components (which includes carbon).

Alternatively, to prevent the deterioration of the sorbent during injection at such elevated temperatures, the injection lances can themselves be cooled by having a water or air jacket so that the temperature within the lance does not increase above the reaction/ignition temperature of the sorbent components (typically the temperature should be kept below about 700° F.). Another method to keep temperatures below about 700° F. is to have a water spray injected with the sorbent into the lance, so that water evaporation as the sorbent moves through the lance will keep the temperature of the sorbent below its ignition point.

The invention may also be advantageously applied to other systems besides coal-fired boilers where mercury is released via heating of materials and ends up in a hot gas stream, for example in waste incineration plants.

If a hot-side electrostatic precipitator (ESP) is present in a coal-fired or alternative fuel-fired system which releases mercury into the combustion gases, injection upstream of a heat exchanger (such as an economizer) or any other device that is located ahead of the hot-side ESP is recommended. Injection should be performed into the flue gas where the flue gas temperature is at a value above about 1100° F. and below about 2000° F. More preferably, the injection location is such that the material is injected into the flue gas, where the flue gas temperature is at a value above about 1300° F., but below about 2000° F.

BRIEF DESCRIPTION OF THE DRAWINGS

The present invention is illustrated by way of example and not limitation in the figures of the accompanying drawings, in which like references indicate similar elements and in which.

DESCRIPTION OF THE EMBODIMENTS

Figure 1:
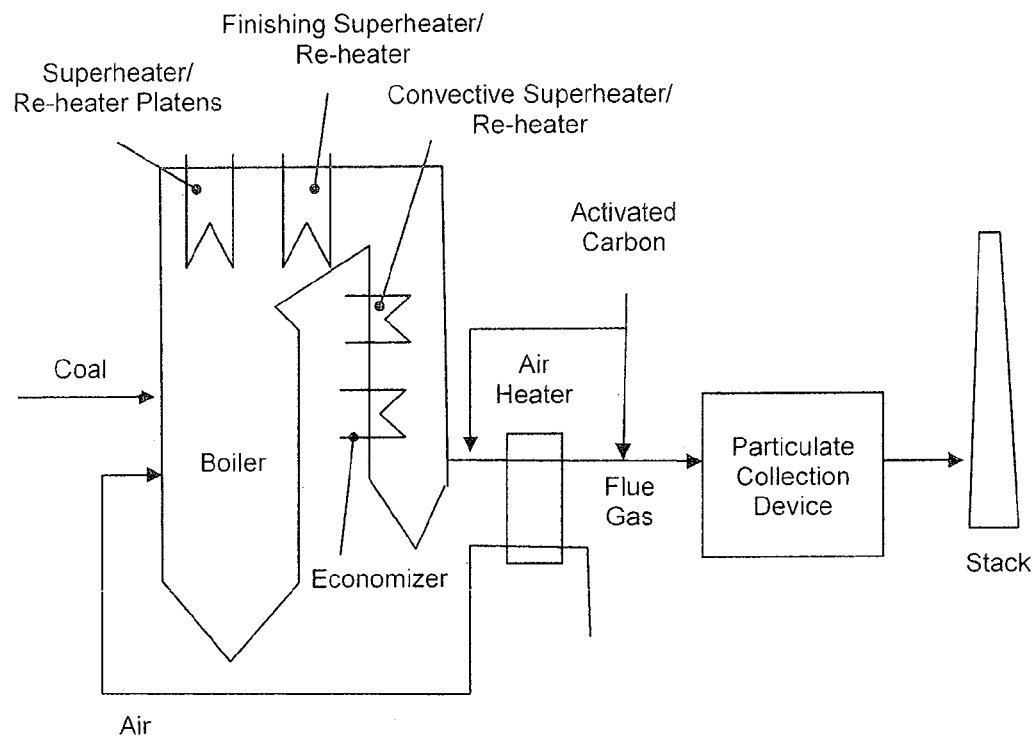
FIG. 1 provides and overview of a typical coal-fired power plant

FIG. 1 provides an overview of a typical coal-fired power plant. The configuration, in this example, consists of a boiler, where water is evaporated to steam, followed by steam superheater and re-heater sections (platens, finishing section, convective), an economizer section (where the boiler feed-water is pre-heated), and finally an air heater, where the combustion air is pre-heated. The combustion flue gas is cooled as it passes through each of these sections, transferring its heat to the water/steam stream on the other side of the heat exchangers. In a typical application, carbon sorbents are injected in the flue gas duct upstream of a particulate removal device such as a fabric filter or an electrostatic precipitator (FIG. 1), usually downstream of the air pre-heater and before the particulate removal device. The activated carbon used for such injection can be manufactured off-site from carbonaceous materials like coal, wood, or coconut shells.

Figure 2:
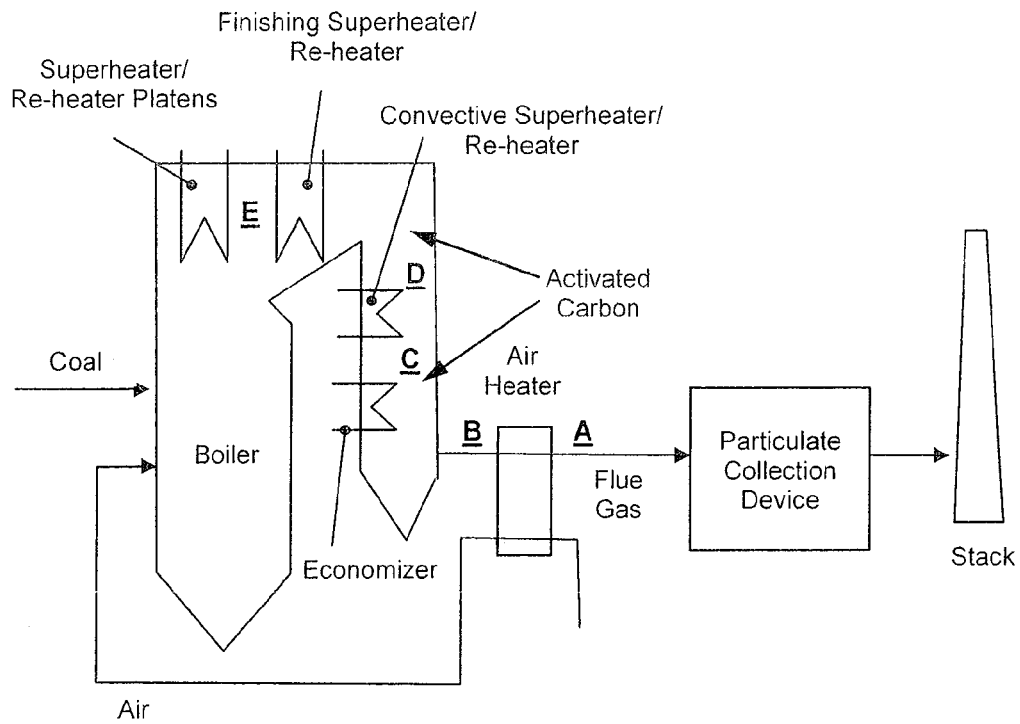
FIG. 2 shows the preferred locations of injection of sorbent to enhance mercury control according to the invention.
Figure 3:
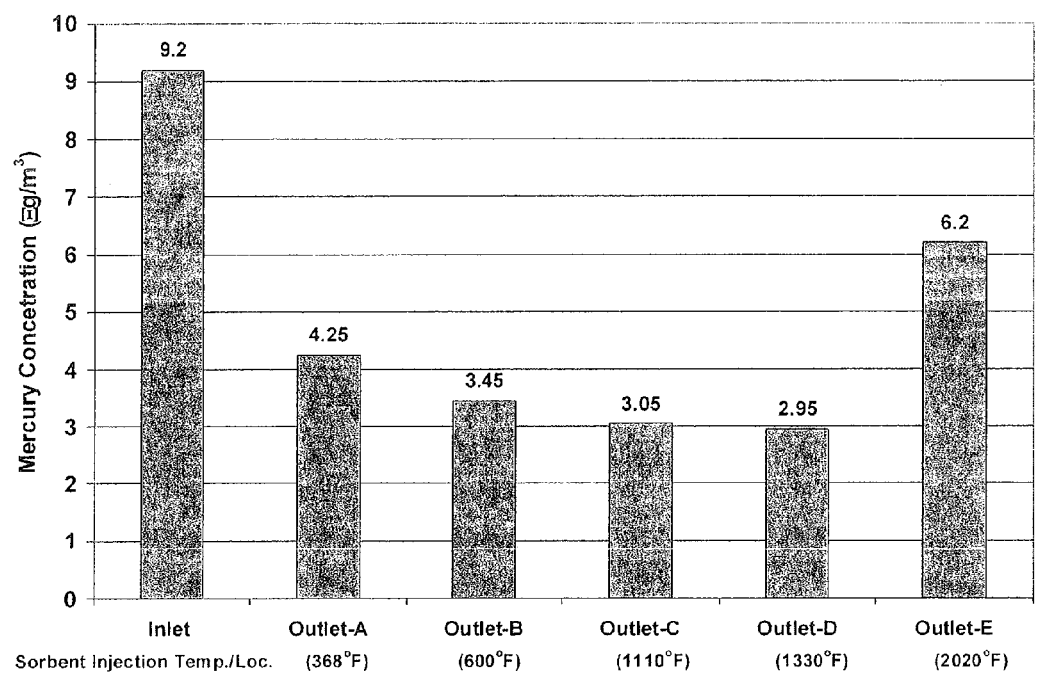
FIG. 3 shows the impact of injection location according to the invention on outlet mercury concentrations for a brominated activated carbon sorbent for a cold-side precipitator (ESORB-HG series brominated activated carbon sorbent provided by Envergex LLC, Sturbridge, Mass.).
Figure 4:
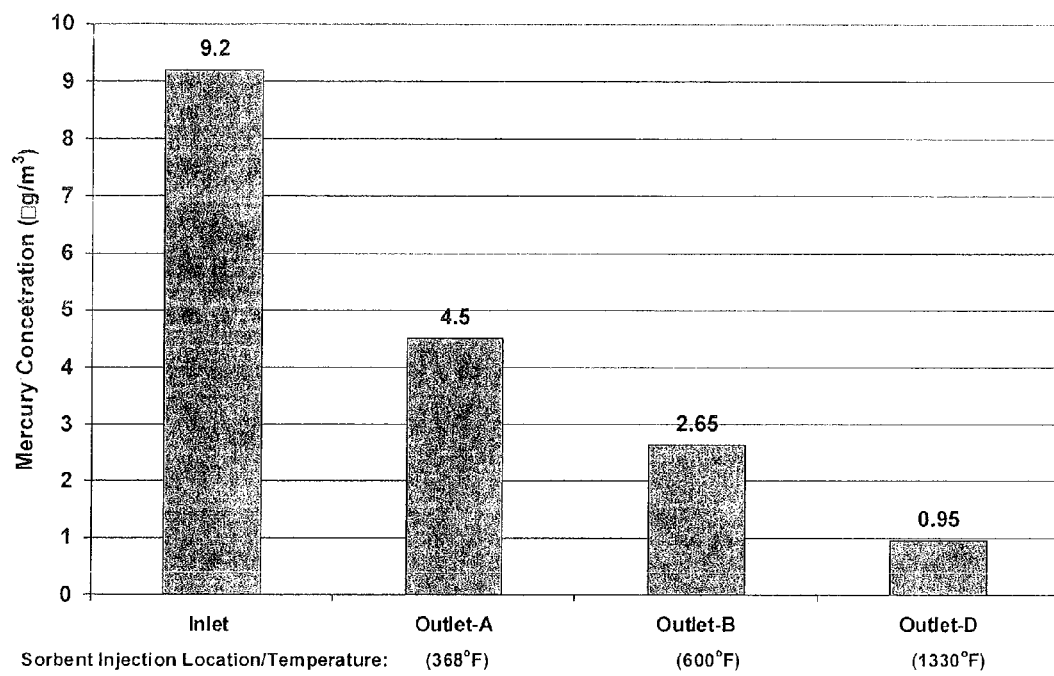
FIG. 4 provides the data for outlet mercury concentrations for one of the sorbents which has brominated activated carbon and an alkaline additive (ESORB-HG series brominated activated carbon with an alkaline additive provided by Envergex LLC, Sturbridge, Mass.) injected at various locations upstream of and collected in a cold-side precipitator operating at temperature of about 300° F. This configuration had $SO_3$ injection just upstream of the cold-side precipitator to improve precipitator performance.
Figure 5:
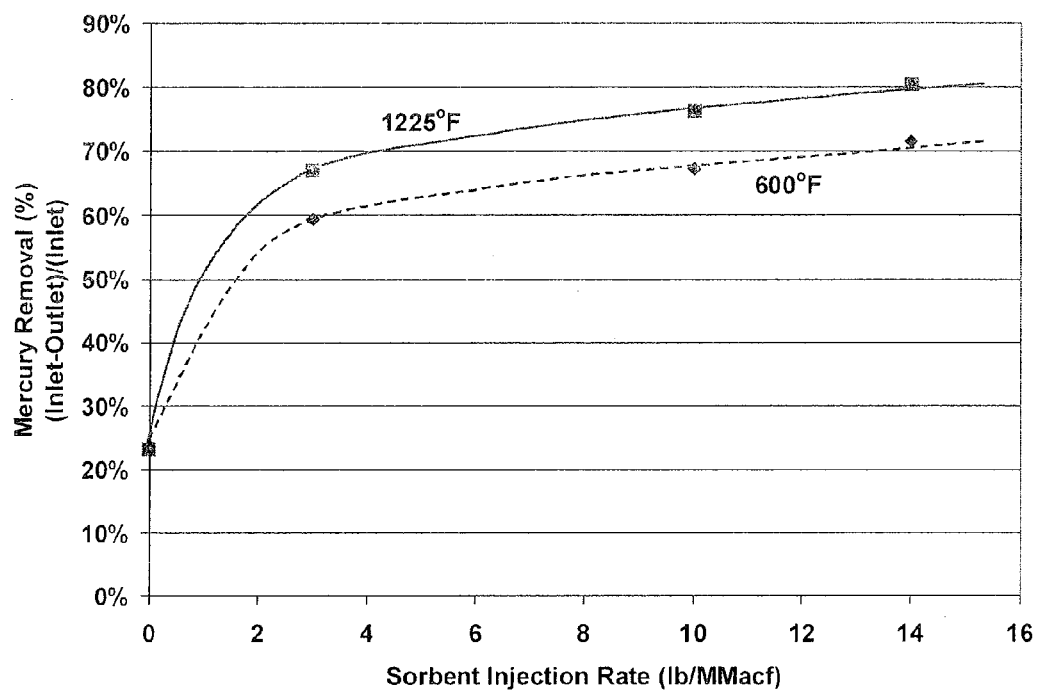
FIG. 5 provides data for mercury removal as a function of sorbent injection rate (ESORB-HG series brominated activated carbon with an alkaline additive provided by Envergex LLC, Sturbridge, Mass.) with the sorbent injected upstream of and collected in a hot-side precipitator.

FIG. 2 shows exemplary new locations of injection of sorbent to enhance mercury control according to the invention. FIG. 3 shows the impact of injection location for a brominated activated carbon sorbents (ESORB-HG series brominated activated carbon sorbent provided by Envergex LLC, Sturbridge, Mass.) as a function of injection location and where the sorbent is collected along with the fly ash from the combusted coal in a cold-side precipitator operating at about 300° F. It is observed that the best performance is obtained when sorbent injected around 1300° F. FIG. 4 provides the data for one of the sorbents which has brominated activated carbon and an alkaline additive (ESORB-HG series brominated activated carbon sorbent with an alkaline additive provided by Envergex LLC, Sturbridge, Mass.). In this particular case, 20 ppm $SO_3$ was injected just upstream of the cold-side ESP to simulate flue gas conditioning for particulate control. FIG. 5 provides data for mercury removal as a function of sorbent injection rate (ESORB-HG series brominated activated carbon with an alkaline additive provided by Envergex LLC, Sturbridge, Mass.) with the sorbent injected at two locations upstream of and collected in a hot-side precipitator operating at a temperature of about 580° F. Injection at a temperature of about 1225° F. provided a better mercury removal for all injection rates compared to injection just upstream of the hot-side precipitator at 600° F.

In a first set of examples of the invention, a pilot-scale combustor for firing pulverized coal was used to generate flue gases with mercury. This combustor was equipped with heat exchangers to cool the flue gas down to about 300 to 350° F., before an ESP (cold-side) was used to capture the particulate. Typically, the combusted flue gas exits the main furnace around 2000 to 2200° F. Sorbent was injected at multiple locations along the flue gas path as the flue gas cooled. Injection locations (A, B, C, D, and E, FIG. 2) corresponding to different flue gas temperatures, which would simulate different points in a full-scale boiler and at successively shorter distances from (closer to) the ESP, were used. Sorbent was injected into the flue gas through a pipe, which was exposed to ambient air temperature external to the flue gas duct, and only a small portion of the injection pipe (one or two inches) penetrated the duct carrying the flue gas. Because of this, the injected sorbent was maintained at a relatively cold temperature while being entrained by the conveying gas (air) and was subjected to the high temperatures of the flue gas only after being mixed with the low-oxygen content flue gas. All of the particulate, including the fly ash generated from the combustion of coal and the injected sorbent were collected in the ESP. Inlet mercury consists of mercury released by the coal during combustion and outlet mercury in the flue gas was measured after the ESP (remaining after sorbent treatment of the flue gas) using a continuous mercury analyzer.

The coal used was a Powder River Basin coal (sub-bituminous) with less than 100 ppm chlorine in the coal containing about 0.3 percent sulfur on an as-received basis.

Brominated activated carbon sorbents with and without alkaline additives (ESORB-HG series sorbents provided by Envergex LLC, Sturbridge, Mass.) were injected at locations A, B, C, D and E in the flue gas duct and mercury control performance observed.

FIG. 3 provides the data for one of the brominated activated carbon sorbents as a function of injection location. The injection rate of the brominated activated carbon sorbent was 1.0 lb/MMacf of flue gas (gas flow used for sorbent rate determination calculated at 300° F.). Mercury concentration in the exhaust flue gas (cold-side ESP outlet) decreased as the sorbent injection location was moved to higher temperatures successively from a location simulating the region between an air heater and a cold-side ESP (location A), region simulating the location between the economizer and an air heater (location B), region simulating the location upstream of the economizer (location C), region simulating the location in the super-heater/re-heater section (location D). Mercury concentration in the exhaust flue gas increased when the injection temperature location was moved further to correspond to flue gas temperature of about 2000° F. (location E). It is observed that the best performance is obtained when sorbent was injected at around 1300° F.

FIG. 4 provides data for a sorbent which has brominated activated carbon and an alkaline additive. In this particular case, 20 ppm $SO_3$ was injected just upstream of the cold-side ESP to simulate flue gas conditioning. The injection rate of the brominated activated carbon sorbent with the alkaline additive was 5.0 lb/MMacf of flue gas (gas flow used for sorbent rate determination calculated at 300° F.), while the injection rate of the brominated activated sorbent not including the alkaline additive was 3.0 lb/MMacf. Mercury concentration in the exhaust flue gas (cold-side ESP outlet) decreased as the sorbent injection location was moved to higher temperatures successively from a location simulating the region between an air heater and a cold-side ESP (location A), region simulating the location between the economizer and an air heater (location B), and region simulating the location in the super-heater/re-heater section (location D). It is observed that the best performance was obtained when sorbent was injected around 1300° F.

In both cases, with and without $SO_3$ injection, dramatic improvement in sorbent performance and mercury capture was observed with temperatures above about 1100° F. compared to injection at lower temperatures. The results support the conclusion that the PAC is not consumed by the hot flue gas, a result not expected according to the prior art.

Table 1 provides the effect of the sorbent injection on foam index measurements of the ash collected (along with the sorbent) in the cold-side ESP.

Foam index testing was performed on 3 fly ash samples which were collected in the cold-side ESP when firing the coal alone and with sorbent injection. All samples were titrated three times and the results are averages of the data. The blank value used for Portland cement in the test was 100 µL or two 50-µL drops. The common convention of 50 µL per drop was used for the calculations. The foam index values indicate the additional amount of air entraining agent (AEA) required by a 20% addition of ash to the standard sample of Portland cement. The AEA used was a 10% solution (V/V) AEA-92. This product is sodium tetradecene-sulfonate with a small amount of 4-chloro-3-methyl phenol added. This product is manufactured by Euclid Chemical Company, Cleveland, Ohio. Results of the foam index testing are shown in Table 1 below.

TABLE 1

Effect of the sorbent injection on foam index measurements of the ash collected (along with the sorbent) in the cold-side ESP

| Sample | Sample Description | Surfactant Additive, 0.75 lb/MMacf | Additional µL Surfactant (blank subtracted) | Drops |
|---|---|---|---|---|
| 1 | Baseline ash | — | 0 | 0 |
| 2 | Brominated activated Carbon (eSorb-Hg series); 3 lb/MMacf, 1330° F. sorbent injection | — | 0 | 0 |
| 3 | Brominated activated Carbon (eSorb-Hg series); 3 lb/MMacf, 1330° F. sorbent injection | Yes, separate at 360° F. | −100 | −2 |

Sample 1 (baseline ash) and Sample 2 (ash collected during activated carbon-based sorbent injection at 1330° F.) required the same amount of surfactant as the cement blank, indicating that the inventive method of injection did not impact the foam index of the ash. Sample 3 appeared to foam upon addition of water, indicating that surfactant additive injected at lower temperatures (360° F.) at the same time as the activated carbon-based sorbent injection at the (high temperature) location where the flue gas temperature was around 1330° F., improved the foam index properties of the collected ash. Most likely the surfactant additive was acting to reduce surface tension in the solution and promote foaming. The foam that was present in the three samples was quite stable. These results show the beneficial effect of carbonaceous sorbent injection at the high flue gas temperature locations. No data is available for injection of carbonaceous sorbent in the flue gas at lower temperatures, although from an understanding of the prior art it is anticipated that the foam index value of the collected fly ash with the injection of this carbonaceous sorbent at lower injection temperatures will be degraded. Prior art indicated a deleterious effect of injecting activated carbon-based sorbent on the foam index of the collected fly ash even at injection temperatures of about 800° F. (Kang et al. 2007).

In a second set of examples, a pilot-scale combustor for firing pulverized coal was used to generate flue gases with mercury. This combustor was equipped with heat exchangers to cool the flue gas down to about 580° F., before an ESP (hot-side) was used to capture the particulate. Typically, the combusted flue gas exiting the main furnace was around 2000 to 2200° F. Sorbent was injected at two locations along the flue gas path as the flue gas cooled: (i) just upstream of the hot-side ESP at around 600° F., which would correspond to a location between the economizer and the hot-side ESP in a full-scale boiler and (ii) further upstream of the hot-side ESP at around 1225° F., which would correspond to a location in the supper-heater/reheater region of the boiler. All of the particulate, including the fly ash generated from the combustion of coal and the injected sorbent were collected in the ESP. Inlet mercury consists of mercury released by the coal during combustion and outlet mercury in the flue gas was measured after the hot-side ESP (remaining after sorbent treatment of the flue gas) using a continuous mercury analyzer.

The coal used was a bituminous coal with approximately 0.9 percent sulfur on an as-received basis.

Brominated activated carbon sorbent with alkaline additives (ESORB-HG series sorbents provided by Envergex LLC, Sturbridge, Mass.) was injected at the two above-mentioned locations in the flue gas duct at different injection rates and mercury control performance observed. FIG. 5 provides data for mercury removal at two injection locations and at three injection rates. This shows that better performance is obtained when sorbent is injected around 1225° F. compared to injection at 600° F.

In the preceding detailed description, the invention is described with reference to specific exemplary embodiments thereof. Various modifications and changes may be made thereto without departing from the broader spirit and scope of the invention as set forth in the claims. The specification and drawings are, accordingly, to be regarded in an illustrative rather than a restrictive sense.

The invention claimed is:

1. A method for removing mercury from a flue gas stream resulting from the combustion of a fuel that has mercury, wherein when combusted the fuel is converted to a high temperature flue gas via oxidation and mercury is released into the gas stream as vapor phase species, and the flue gas is then cooled after combustion, the method comprising:
providing a powdered activated carbon-based sorbent;
injecting the sorbent into the flue gas stream at a location at which the flue gas has a temperature of greater than 1100° F., wherein the sorbent adsorbs mercury species from the flue gas; and
removing the sorbent with adsorbed mercury species downstream of the sorbent injection location.

2. The mercury removal method of claim 1 in which the sorbent is injected via an enclosed injection lance with an outlet located in the flue gas stream, wherein the sorbent is carried through the lance by a carrier stream, and wherein oxidation of the sorbent is reduced by either cooling of the lance or the carrier stream, or by the use of a reduced oxygen carrier stream.

3. The mercury removal method of claim 1 in which the flue gas is conditioned to enhance particulate removal by injection of $SO_3$, and the sorbent injection step occurs upstream of the $SO_3$ injection.

4. The mercury removal method of claim 3 in which the sorbent is injected via an enclosed injection lance with an outlet located in the flue gas stream, wherein the sorbent is carried through the lance by a carrier stream, and wherein oxidation of the sorbent is reduced by either cooling of the lance or the carrier stream, or by the use of a reduced oxygen carrier stream.

5. The mercury removal method of claim 1 in which the sorbent comprises a halogenated powdered activated carbon.

6. The mercury removal method of claim 5 in which the sorbent further comprises an alkaline additive.

7. The mercury removal method of claim 1 in which the sorbent further comprises an alkaline additive.

8. The mercury removal method of claim 1 in which the sorbent is injected at a location at which the flue gas has a temperature of at least about 1300° F.

9. The mercury removal method of claim 1 in which the sorbent is injected at a location at which the flue gas has a temperature of at least 1100° F. and no more than about 2000° F.

10. A method for removing mercury from a solid fuel combustion flue gas stream, in which the flue gas is created via fuel combustion in a boiler, and the flue gas is conveyed from the boiler in a stream past a superheater/reheater, past an economizer, and past an air heater, and the stream also passes through a particulate collection device, the method comprising: providing a powdered activated carbon-based sorbent that adsorbs mercury from the flue gas; injecting the sorbent into or upstream of the economizer via an enclosed injection lance with an outlet located in the flue gas stream, wherein the sorbent is carried through the lance by a carrier stream, and wherein oxidation of the sorbent is reduced by either cooling of the lance or the carrier stream, or by the use of a reduced oxygen carrier stream; and removing the sorbent with adsorbed mercury species downstream of the sorbent injection location; wherein the sorbent is injected at a location at which the flue gas has a temperature of at least 1100° F.

11. The mercury removal method of claim 10 in which the sorbent comprises a halogenated powdered activated carbon.

12. The mercury removal method of claim 11 in which the sorbent further comprises an alkaline additive.

13. The mercury removal method of claim 10 in which the sorbent further comprises an alkaline additive.

14. The mercury removal method of claim 10 in which the sorbent is injected at a location at which the flue gas has a temperature of at least about 1300° F.

15. The mercury removal method of claim 10 in which the sorbent is injected at a location at which the flue gas has a temperature of at least 1100° F. and no more than about 1800° F.

16. A method of capturing mercury from a flue gas stream and creating a combustion fly ash that can be used as a concrete filler with reduced need for air entraining agent, comprising:
providing a powdered activated carbon-based sorbent that adsorbs mercury from the flue gas;
injecting the sorbent into the flue gas stream at a location at which the flue gas has a temperature of greater than 1100° F., wherein the flue gas stream comprises fly ash; and
removing the sorbent and the fly ash downstream of the injection location.

17. The method of claim 16 in which the sorbent is injected into the flue gas at a location at which the flue gas has a temperature of at least about 1300° F.

18. The method of claim 16 in which the flue gas is conditioned to enhance particulate removal by injection of $SO_3$, and the sorbent injection step occurs upstream of the $SO^3$ injection.

19. The method of claim 16 in which the sorbent is injected via an enclosed injection lance with an outlet located in the flue gas stream, wherein the sorbent is carried through the lance by a carrier stream, and wherein oxidation of the sorbent is reduced by either cooling of the lance or the carrier stream, or by the use of a reduced oxygen carrier stream.

20. The method of claim 16 in which the sorbent comprises a halogenated powdered activated carbon.

21. The method of claim 20 in which the sorbent further comprises an alkaline additive.

22. The method of claim 16 in which the sorbent further comprises an alkaline additive.

23. The method of claim 16 in which the sorbent is injected at a location at which the flue gas has a temperature of at least about 1300° F.

24. The method of claim 16 in which the sorbent is injected at a location at which the flue gas has a temperature of at least 1100° F. and no more than about 2000° F.

* * * * *